(12) United States Patent
Davis et al.

(10) Patent No.: US 6,771,723 B1
(45) Date of Patent: Aug. 3, 2004

(54) NORMALIZED PARAMETRIC ADAPTIVE MATCHED FILTER RECEIVER

(76) Inventors: Dennis W. Davis, 207 E. Woodward Ave., Eustis, FL (US) 32726; James H. Michels, 3779 Lighthouse Rd., Henderson, NY (US) 13650; Jaime R. Román, 2250 Quail Ridge N., Palm Beach Gardens, FL (US) 33418

( * ) Notice: Subject to any disclaimer, the term of this patent is extended or adjusted under 35 U.S.C. 154(b) by 613 days.

(21) Appl. No.: 09/616,770

(22) Filed: Jul. 14, 2000

(51) Int. Cl.$^7$ ................................................ H04B 1/10
(52) U.S. Cl. ...................... 375/350; 375/227; 375/340; 375/343; 375/346
(58) Field of Search ................................. 375/227, 260, 375/267, 340, 343, 346, 347, 350; 342/89, 90, 91

(56) References Cited

U.S. PATENT DOCUMENTS 5,357,256 A * 10/1994 Peperone .................... 342/160
6,226,321 B1 * 5/2001 Michels et al. ............. 375/227

* cited by examiner

Primary Examiner—Stephen Chin
Assistant Examiner—David B. Lugo

(57) ABSTRACT

Disclosed is an apparatus and method for improving the detection of signals obscured by either correlated Gaussian or non-Gaussian noise plus additive white noise. Estimates from multichannel data of model parameters that describe the noise disturbance correlation are obtained from data that contain signal-free data vectors, referred to as "secondary" or "reference" cell data. These parameters form the coefficients of a multichannel whitening filter. A data vector to be tested for the presence of a signal passes through the multichannel whitening filter. The filter output is then processed to form a test statistic. The test statistic is compared to a threshold value to decide whether a signal is "present" or "absent." The method is effective in detecting targets without knowledge of the non-Gaussian noise statistics.

4 Claims, 14 Drawing Sheets

The Normalized Parametric Adaptive Matched Filter (N-PAMF) Detection Architecture

DATA CUBE

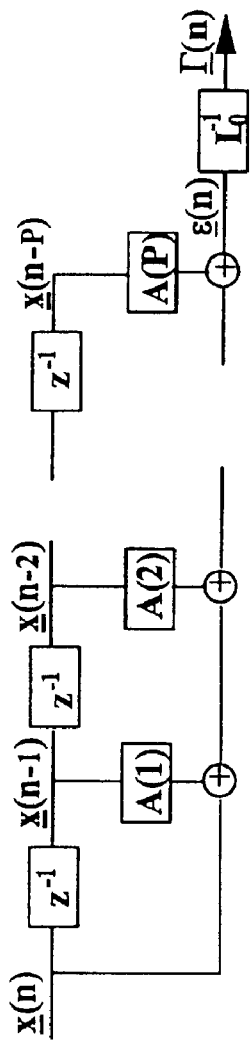
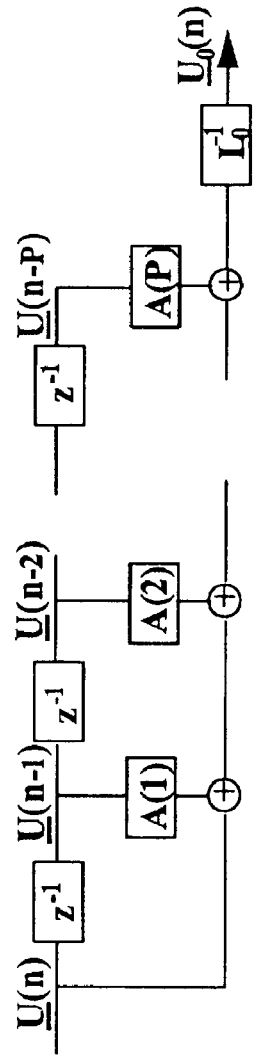
Figure 4A
PRIOR ART
Figure 4B
PRIOR ART

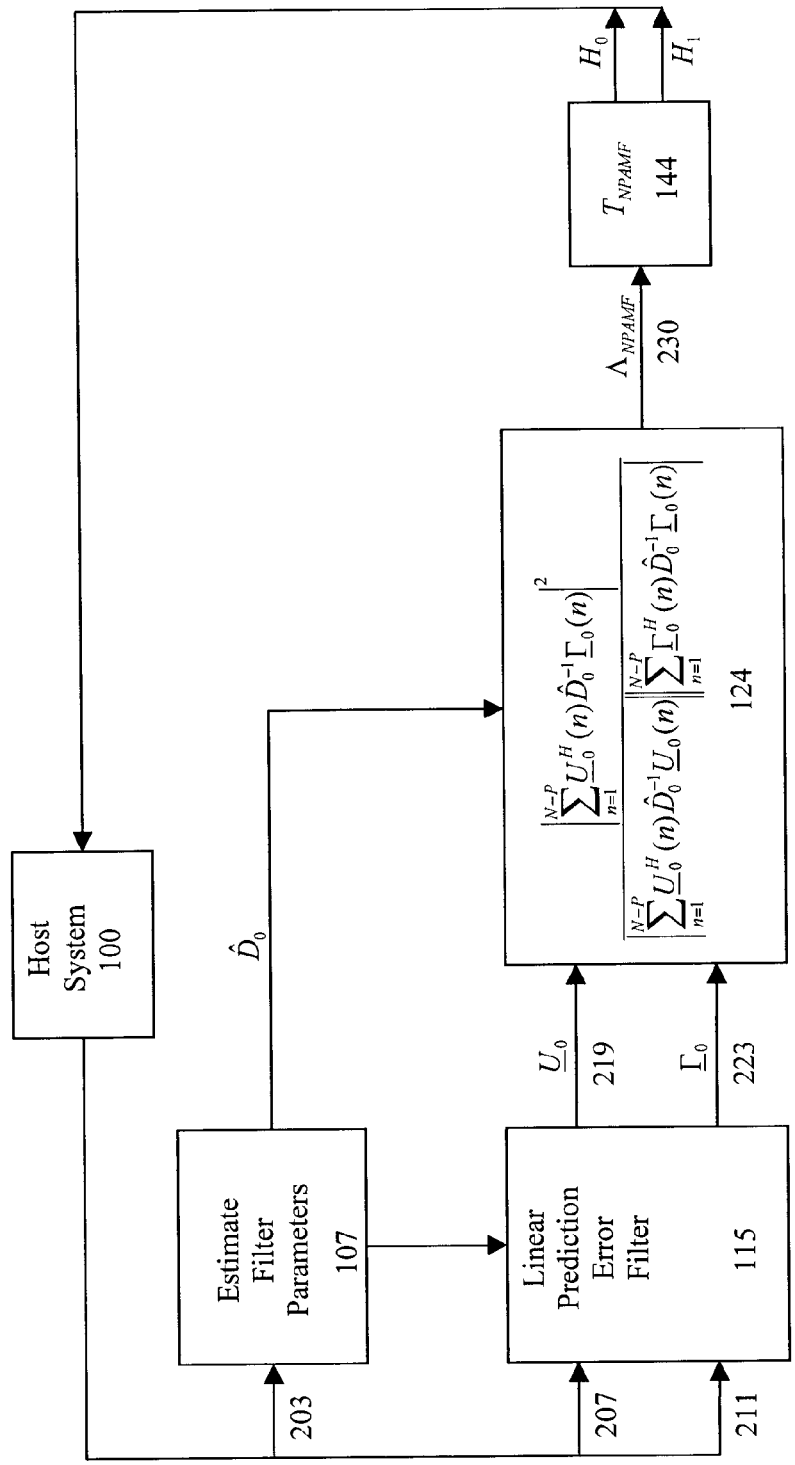
Fig. 6 The Normalized Parametric Adaptive Matched Filter (N-PAMF) Detection Architecture

NORMALIZED PARAMETRIC ADAPTIVE MATCHED FILTER RECEIVER

STATEMENT OF GOVERNMENT INTEREST

The invention described herein may be manufactured and used by or for the US Government for governmental purposes without the payment of any royalty thereon.

BACKGROUND OF THE INVENTION

1. Background-Field of the Invention

The present invention relates to improving the detection performance of multi-channel receivers, and, in particular, to improving the detection of signals masked by the presence of partially correlated Gaussian or non-Gaussian noise plus additive Gaussian thermal white noise. The apparatus and method of the present invention is directed to the signal processing architecture and computational procedures of multi-channel receivers. The present invention has radar, sonar, geophysical, and biomedical applications.

2. Background-Description of the Prior Art

The use of multi-channel signal processing methods to detect the presence of a desired signal is well established. Basing such methods on parametric models offers the prospect of improved performance over the prior art.

In airborne array radar applications, for example, with J antenna elements (spatial channels) and N pulses per coherent processing interval ("CPI"), optimal signal detection methods using both angle- and Doppler-processing require joint space-time matched filtering in the $JN \times JN$ complex vector space. Such techniques are generally computationally prohibitive, and they require large amounts of secondary data (i.e., data from the radar surveillance region assumed to be free of the target signal of interest) to estimate the noise disturbance correlation. In addition, for conditions of non-homogeneous clutter, the secondary data may lack statistical equivalence to that in the range cell under test. Also, for the conventional Gaussian receiver, distinct thresholds must be established for individual range-azimuth cells over the entire radar surveillance volume. This requirement follows from the observation that the data sequence of N pulses is Gaussian for each individual range cell but non-Gaussian from cell to cell.

The performance of Gaussian receivers is improved to a degree by the systems described in the following U.S. patents:

- U.S. Pat. No. 5,640,429 issued to Michels and Rangaswamy
- U.S. Pat. No. 5,272,698 issued to Champion
- U.S. Pat. No. 5,168,215 issued to Puzzo
- U.S. Pat. No. 4,855,932 issued to Cangiani
- U.S. Pat. No. 6,226,321 issued to Michels, et. al.

Cangiani et al. discloses a three dimensional electro-optical tracker with a Kalman filter in which the target is modeled in space as the superposition of two Gaussian ellipsoids projected onto an image plane. Puzzo offers a similar disclosure. Champion discloses a digital communication system.

Michels et al., U.S. Pat. No. 6,226,321, hereby incorporated by reference, discloses implementations, for a signal that has unknown amplitude. For the signal of unknown amplitude, Michels et al. teaches how to incorporate the estimated signal amplitude directly into the parametric detection procedure. Furthermore, Michels teaches two separate methods, namely, (1) how to detect the signal in the presence of partially correlated non-Gaussian clutter disturbance and (2) how to detect the signal in the presence of partially correlated Gaussian clutter disturbance. Furthermore, the method to detect the signal in the presence of partially correlated non-Gaussian clutter involves processing the received radar data and requires the use of functional forms that depend upon the probability density function (pdf) of the disturbance. Thus, the latter method requires knowledge of the pdf statistics of the non-Gaussian disturbance. The method does not teach how to process the data in such a manner that would not require knowledge of the disturbance process. Furthermore, it does not teach how to process the data with one method that would detect the signal in either Gaussian or non-Gaussian disturbance. Thus there exists a need for apparatus and method of processing the data with a detection method that does not require knowledge of the clutter statistics. Furthermore, there exists a need for a method that detects the signal in either Gaussian or non-Gaussian disturbance.

The performance improvements of the presently disclosed invention relative to prior art are detailed in J. H. Michels, M. Rangaswamy, and B. Himed, "Evaluation of the Normalized Parametric Adaptive Matched Filter STAP Test in Airborne Radar Clutter," IEEE International Radar 2000 Conference, May 7–11, 2000, Washington, D.C. and J. H. Michels, M. Rangaswamy, and B. Himed, "Performance of STAP Tests in Compound-Gaussian Clutter," First IEEE Sensor Array and Multichannel Signal Processing Workshop (SAM 2000), Mar. 16–17, 2000, Cambridge, Mass. Both of these documents, designated references A and B, respectively, are incorporated herein by reference thereto.

OBJECTS AND SUMMARY OF INVENTION

Therefore one object of the present invention is to provide apparatus and method of detecting desired signals in additive Gaussian or non-Gaussian disturbance processes using single-channel or multiple-channel sensors.

Another of the present invention is to provide apparatus and method of detecting desired signals in additive Gaussian or non-Gaussian disturbance processes that use efficiently the available data from secondary data cells; i.e., require only a small number of secondary data cells.

Still another object of the present invention is to provide apparatus and method of detecting desired signals in additive Gaussian or non-Gaussian disturbance processes that uses linear prediction error filters.

Briefly stated, the present invention provides an apparatus and method for improving the detection of signals obscured by either correlated Gaussian or non-Gaussian noise plus additive jamming interference and thermal white Gaussian noise. Estimates from multi-channel data of model parameters that describe the noise disturbance correlation are obtained from data that contain signal-free data vectors, referred to as "secondary" or "reference" cell data. These parameters form the coefficients of a multi-channel whitening filter. A data vector, referred to as the "test cell" or "primary" data vector, to be tested for the presence of a signal passes through the multi-channel whitening filter. The filter's output is then processed to form a test statistic. The test statistic is compared to a threshold value to decide whether a signal is "present" or "absent". Embodiments of the apparatus and method include estimating the signal amplitude both implicitly and explicitly and calculating test statistics for signal detection in both Gaussian and non-Gaussian noise.

According to an embodiment of the invention, in a system for processing signals, a method for identifying presence or absence of at least one potential target comprises the steps of: receiving from multiple channels signals corrupted by Gaussian or non-Gaussian disturbance; partitioning the signals into secondary data having a low probability of containing the potential target and primary data to be assessed for the presence of the target; estimating at least one linear filter parameter from the secondary data; filtering at least one steering vector and the primary data with at least one whitening filter based on the at least one linear filter parameter to produce at least one steering vector residual and at least one primary data residual; calculating a first test statistic as a function of the at least one linear filter parameter, the at least one steering vector residual, and the at least one primary data residual; and comparing the first test statistic to a threshold value to provide a "target present" or a "target absent" response when the signals are corrupted by Gaussian disturbance.

According to a feature of the invention, in a system for processing signals, a method for identifying presence or absence of at least one potential target comprises the steps of: receiving from multiple channels signals corrupted by Gaussian or non-Gaussian disturbance; partitioning the signals into secondary data having a low probability of containing the potential target and primary data to be assessed for the presence of the target; estimating at least one linear filter parameter from the secondary data; filtering at least one steering vector and the primary data with at least one whitening filter based on the at least one linear filter parameter to produce at least one steering vector residual and at least one primary data residual; estimating signal amplitude as a function of the at least one linear filter parameter, the at least one steering vector residual, and the at least one primary data residual, thereby obtaining an estimated signal amplitude; multiplying the at least one steering vector residual by the estimated signal amplitude to obtain a scaled steering vector residual; subtracting the scaled steering vector residual from the at least one primary data residual to create an intermediate result; calculating a first quadratic term as a function of the at least one primary data residual and the at least one linear filter parameter; calculating a second quadratic term as a function of the intermediate result and the at least one linear filter parameter; subtracting the second quadratic term from the first quadratic term to form a first test statistic; and comparing the first test statistic to a threshold value to provide a "target present" or a "target absent" response when the signals are corrupted by Gaussian disturbance.

According to another feature of the invention, apparatus for processing signals from which to identify presence or absence of at least one potential target, comprises: means for receiving multi-channel signals containing the at least one potential target obscured by Gaussian or non-Gaussian disturbance; means for partitioning the signals into secondary data having a low probability of containing the potential target and primary data to be assessed for the presence of the potential target; means for estimating at least one linear filter parameter from the secondary data; means for filtering at least one steering vector and the primary data with at least one whitening filter based on the at least one linear filter parameter to produce at least one steering vector residual and one primary data residual; first calculating means for calculating a first test statistic as a function of the at least one linear filter parameter, the steering vector residual, and the primary data residual; and means for comparing effective for comparing the first test statistic to a threshold value to provide a "target present" or a "target absent" response when the signals are corrupted by Gaussian disturbance.

According to still another feature of the invention, apparatus for processing signals from which to identify presence or absence of at least one potential target, comprises: means for receiving multi-channel signals containing the potential target obscured by Gaussian or non-Gaussian disturbance; means for partitioning the signals into secondary data having a low probability of containing the potential target and primary data to be assessed for the presence of the potential target; means for estimating at least one linear filter parameter from the secondary data; means for filtering at least one steering vector and the primary data with at least one whitening filter based on the at least one linear filter parameter to produce at least one steering vector residual and one primary data residual; first calculating means for calculating an estimate of signal amplitude as a function of the at least one linear filter parameter, the steering vector residual, and the primary data residual; means for multiplying the filtered steering vector residual by the estimate of signal amplitude to create a scaled steering vector residual; first subtracting means for subtracting the scaled steering vector residual from the primary data residual to create an intermediate result; second calculating means for calculating a first quadratic term as a function of the primary data residual and the at least one linear filter parameter; third calculating means for calculating a second quadratic term as a function of the intermediate result and the at least one linear filter parameter; second subtracting means for subtracting the second quadratic term from the first quadratic term to form a first test statistic; and means for comparing the first test statistic to a threshold value to provide a "target present" or a "target absent" response when the signals are corrupted by Gaussian disturbance.

The apparatus and method of the present invention provide a multi-channel receiver that improves the detection of target signals in the presence of either Gaussian or non-Gaussian correlated clutter together with additive jamming interference and thermal white noise. Further, the present invention provides such improved target detection without requiring knowledge of the clutter statistics. The present invention improves detection for radar, sonar, biomedical diagnostics, geophysical data processing, etc., where the input data contain either Gaussian or non-Gaussian disturbance. This improvement is achieved through the signal processing architecture and computational procedure described below.

Several important features of the present invention are: (1) it can process both single and multiple channel data; (2) the implementation described below applies to the detection of a signal with unknown amplitude embedded in disturbances of unknown correlation; (3) the detection architecture is canonical for non-Gaussian clutter described by spherically invariant random processes ("SIRPs") (Rangaswamy, M., et. al., "Computer generation of correlated non-Gaussian radar clutter," IEEE Trans. on Aerospace and Electronic Systems, vol. AES-31, pp. 106–116, 1995), i.e., the circuitry does not change when the statistics of the input data processes change; (4) the minimum mean squared error (MMSE) parameter estimators in the present invention are linear for the large class of non-Gaussian SIRPs that comprise the disturbance; (5) the implementation described below for the K (.alpha.=0.5)-receiver offers robust performance for a wide range of non-Gaussian as well as Gaussian noise, where .alpha. is the shape parameter of the clutter probability density function ("pdf").

In the present invention, the unknown disturbance correlation is estimated from secondary data by means of parametric adaptive estimation algorithms. However, the estimate of signal amplitude is now embedded directly into the detection test statistic. Thus a large covariance matrix requiring approximately 2 JN range cells is no longer required, with the result that high detection performance can be achieved with a very low number of range cells.

In a preferred embodiment of the present invention for the detection of moving objects from an airborne radar, the processing system uses baseband sensor data from the A/D converters of an airborne phased array radar. This sensor data is organized as a J.times.1 vector sequence, where each element of the vector corresponds to a particular array element (or column), and each index in the sequence corresponds to a time sample that relates to a specific transmitted pulse of the N pulse coherent processing interval ("CPI"). A third dimension of the data is obtained from the K range rings measured from the radar. These range rings are swept by each pulse, thus providing K with J×1 observation data vectors in fast time for each of the N pulses in slow time. Thus, the data can be stacked in a data cube of dimension J×N×K.

To determine the presence or absence of a target, data are chosen from a specific range cell, the "test cell". Data from range cells immediately surrounding the test cell are "guard band" cell data. Several procedures can determine the disturbance's (e.g., ground clutter, jamming interference, thermal white noise) correlation properties. In one procedure, both the test cell and guard band data are removed from the data cube, leaving the "secondary" or "reference" cell vectors, which are assumed to be signal free. In an alternative procedure, no vectors are removed from the data cube.

Linear parametric models ("LPMs") describe the noise disturbance correlation. There are two general classes of such models for vector random processes: time series and state space. Either kind of LPMs falls within the intended scope of the present invention. Any of several multi-channel algorithms can estimate the parameters of the respective model types. The multichannel least squares (MLS) algorithm (S. L. Marple, Digital Spectral Analysis, Prentice Hall, 1987), Nuttall-Strand (Nuttall, A. H., "Multivariate linear predictive spectral analysis employing weighted forward and backward averaging: A generalization of Burg's algorithm," Naval Underwater Systems Center TR-5501, New London, Conn. October 1976; Strand, O. N., "Multi-channel complex maximum entropy (auto-regressive) spectral analysis," IEEE Trans. Antom. Control, vol, AC-22, pg 634–640, August 1977) and Vierra-Morf (Morf, M., Vierra, A., Lee, D., Kailath, T., "Recursive Multi-channel maximum entropy spectral estimation," IEEE Trans. on Geoscience Electronic, vol GE-16, no 2, April 1978) are algorithms that apply to time series models. A number of recently-developed multi-channel state space algorithms (Roman, J., Davis, D., "Multi-channel Parametric Models for Airborne Radar Array Clutter," 1997 IEEE National Radar Conference, Syracuse, N.Y., May 13–15, 1997) apply to state space models. The model parameters estimated from any candidate algorithm form the coefficients in a multi-channel whitening filter. Both the data vector from the test cell and the known steering vector written in time sequential form are passed through this filter. The output vectors from the multi-channel whitening filter are then processed to form a scalar "test statistic." The "test statistic" is then compared to a threshold value to decide whether a signal is present or absent.

The following definitions serve to clarify the present invention:

A/D Converter: a device that converts analog signals to digital signals.

Adaptive Matched Filter: a matched filter detector in which the disturbance covariance matrix is replaced with its estimate.

Clutter Shape Parameter (a): is the parameter that changes the K-distribution for clutter from Gaussian ($\alpha = \iota\nu\phi$) to a high tailed probability density function ($\alpha = 0.1$). Coefficients of Linear Prediction: the coefficients that weight a linear combination of time series of past data from a given process to estimate the process at some point in time.

Coherent Processing Interval (CPI): the number of pulses generated by a radar in an interval of time over which the radar maintains phase coherence.

Constant False Alarm Rate (CFAR): attribute of a receiver that maintains the false alarm rate fixed in the presence of changing interference levels.

Data Cube: the organization of data consisting of various channels, range cells, and pulses into a three-dimensional configuration for storage.

Diagonal Matrix: a matrix with whose elements are non-zero only along the diagonal.

Diagonal Matrix Coefficient (D): obtained from the LDL decomposition of either the model residual covariance matrix or the sample residual covariance matrix estimates.

Disturbance: all unwanted noise that interferes with the desired signal.

False Alarm: the decision that a signal is present when in fact it is not.

Fast Time: the round-trip time delay, as measured between range cells, of a single radar pulse (which travels at the speed of light).

Guard Band: the data, collected from range rings adjacent to the test cell, which are eliminated from the secondary data cells before estimating the disturbance statistics.

Host System: the system supported by the present invention.

Input Signal-to-Interference plus Noise Ratio: the ratio of the filter input signal power to the input power of the interference and white noise.

Linear Filter Parameters: the estimated coefficients of linear prediction used in the whitening filter of the parametric adaptive matched filter.

Matched Filter: in the context of this application, a linear filter that maximizes the output signal-to-interference-plus-noise ratio.

Model Residual Covariance: the estimated error covariance matrix obtained from a parameter estimation algorithm such as Nuttall-Strand.

Output Signal-to-Interference plus Noise Ratio: the ratio of the filter output signal power to the output power of the interference and white noise.

Prediction Error Filter: a filter that provides the difference operation between the input signal and its estimate formed by the weighted sum of past data values.

Range Rings: the concentric lines of constant range measured from the radar location, each with a width related to the radar bandwidth.

Reference Cell Data: data collected from range rings assumed to be free of the desired signal (also called secondary data).

Sample Covariance Matrix: the estimator of the covariance of a data vector process obtained from the mean of the outer products of the multiple realizations of the data vector.

Sample Residual Covariance: the estimated error covariance matrix obtained by applying the sample covariance matrix estimator to the prediction error filter output data.

Secondary Data: data collected from range rings assumed to be free of the desired signal.

Signal to Interference plus Noise Ratio (SINR): is the ratio of target signal power (or amplitude) to the sum of interference and noise power (or amplitude).

Slow Time: the interval between successive pulses from the radar.

Spherically Invariant Random Process: results from the modulation of a Gaussian process by a statistically independent random variable.

Signal Steering Vector: contains the bearing and Doppler information associated with a radar signal.

Test Cell Data: contained in the radar range cell under test for the presence or absence of a radar signal.

Test Statistic: a scalar quantity, computed from received radar data and compared to a pre-determined threshold value to determine the presence or absence of a radar signal.

Threshold: a scalar quantity compared to a test statistic to determine the presence or absence of a desired signal and chosen to maintain a specific criterion, such as the cost associated with correct and incorrect decisions or the specification of the probability of a false alarm.

Time Sequential Form: in the context of the present invention, the formatting of a signal or data vector as a time series.

Whitening Filter: transforms the correlated input data to uncorrelated white noise.

Zero Memory Non-linear Transform: method of transforming blocks of data to maintain dependence between the individual blocks.

The above and many other objects and advantages of the present invention will be readily apparent to one skilled in the pertinent art from the following detailed description of preferred embodiments of the invention and the related drawings, in which like reference numerals designate the same elements.

BRIEF DESCRIPTIONS OF THE DRAWINGS

FIG. 4A shows a multi-channel tapped delay line linear prediction error filter with J×J matrix coefficients (J channels) processing an observation data vector.

FIG. 4B shows the filter of FIG. 4A rotating a known signal steering vector.

FIG. 6 shows a functional block diagram of the normalized parametric adaptive matched filter.

DETAILED DESCRIPTION OF THE INVENTION

Figure 1:
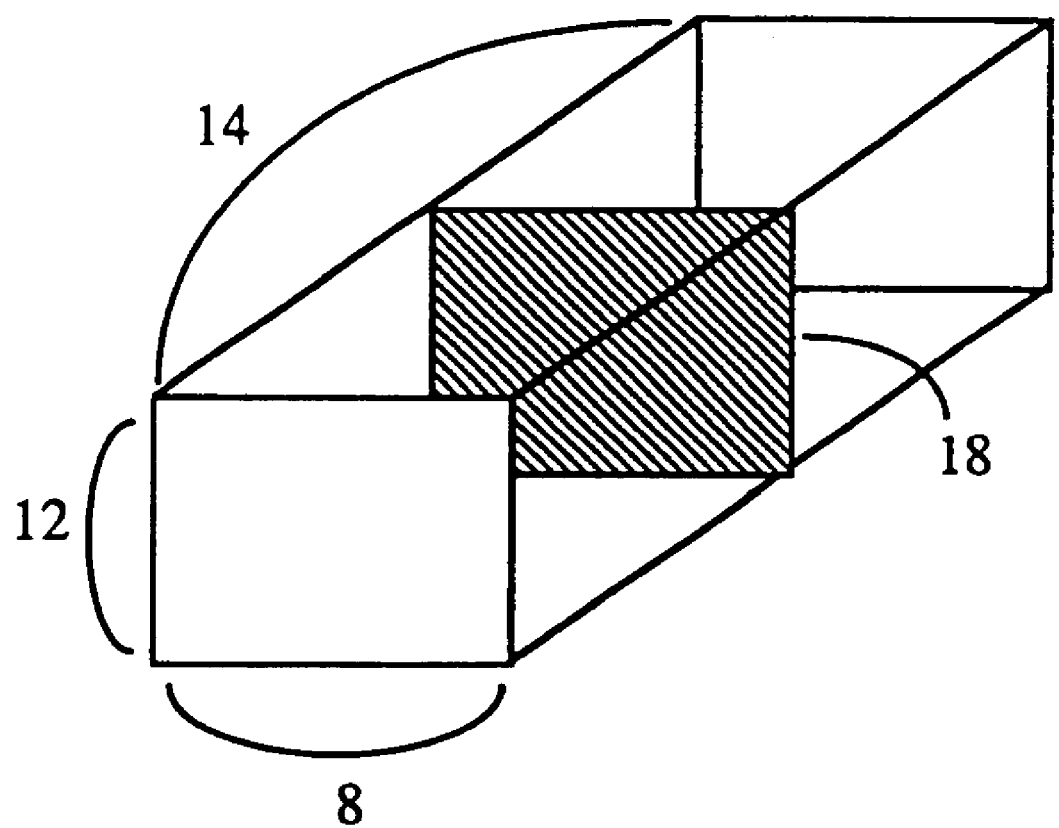
FIG. 1 shows a Data Cube from which secondary and primary data are obtained in an airborne radar application.

Referring to FIG. 1, a data cube 1 depicts a three-dimensional storage configuration for the organization of data over N pulses 8, J channels 12, and K range cells 14. Data cube 1 is divided into three regions. A first region is a test cell 18 containing 'primary data'. Test cell 18 is the range ring under test for the presence or absence of a desired signal. A second region is reference cells or range rings containing 'secondary data' assumed to be free of the desired signal. Thus the second region contains only the disturbance. A third region contains 'guard cells', located on both sides of test cell 18, that isolate test cell 18 from the reference cells. This third region prevents leakage of the signals into the secondary data.

Figure 2:
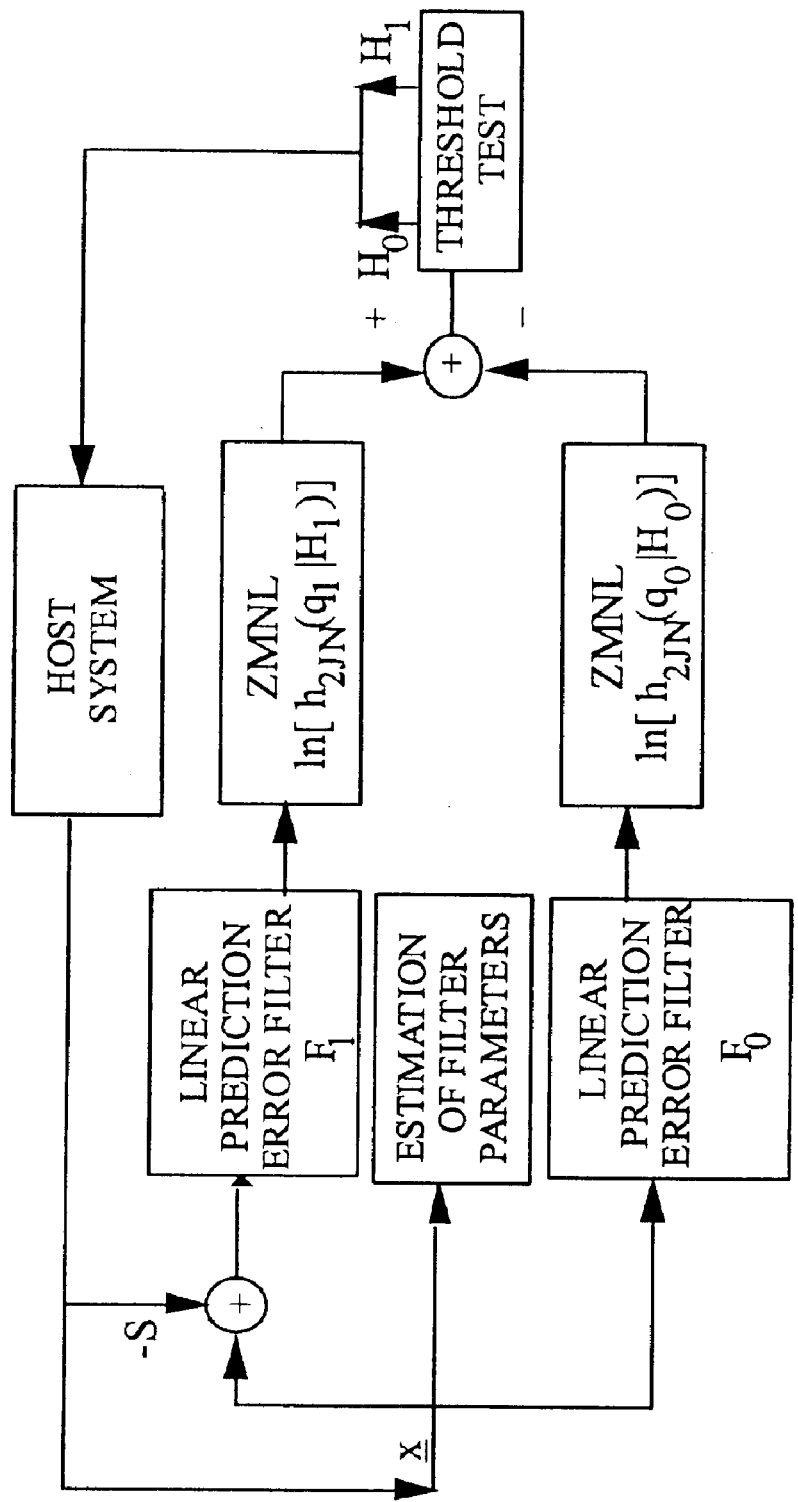
FIG. 2 shows a prior-art non-Gaussian apparatus and method for the case of a desired signal with known amplitude.
Figure 3:
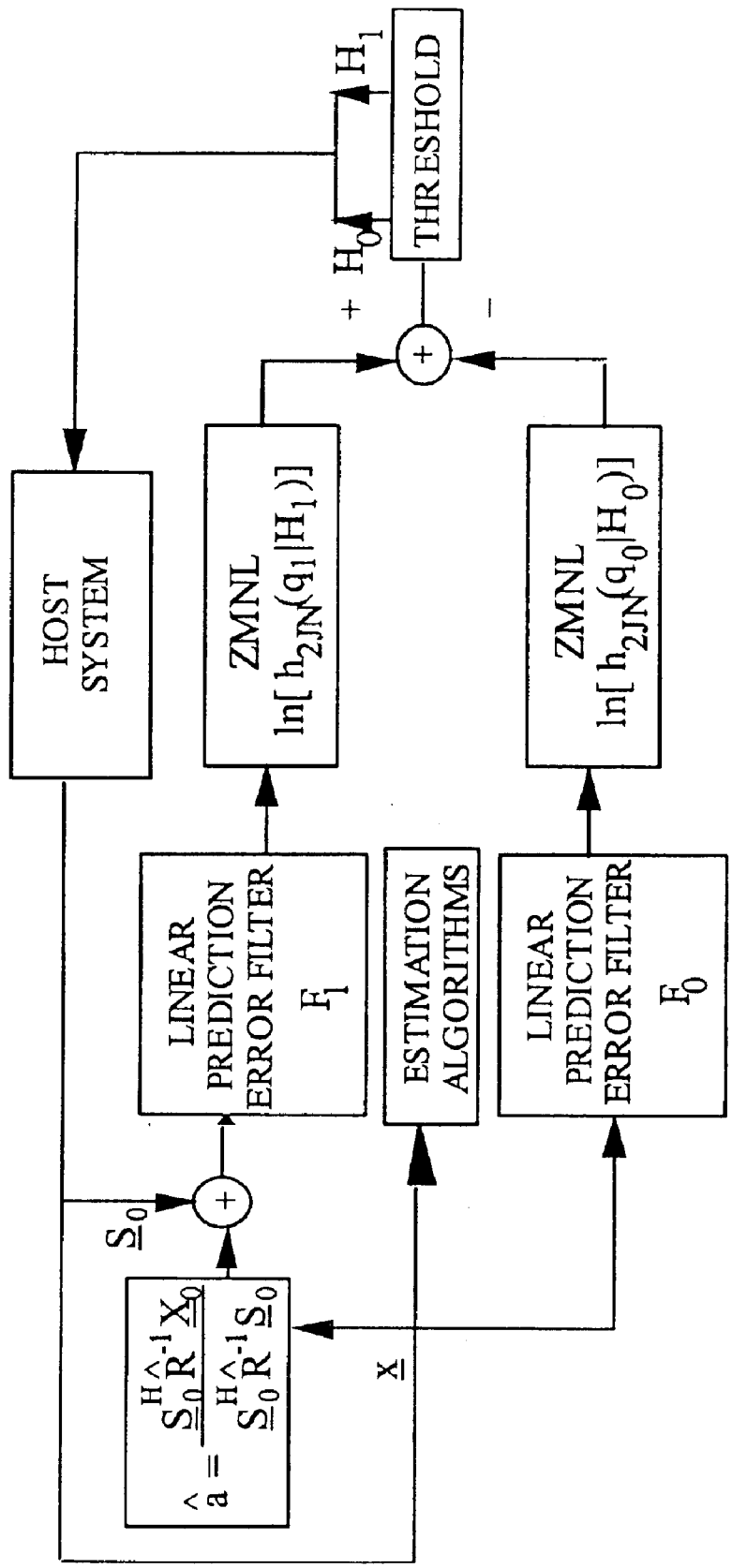
FIG. 3 shows a prior-art non-Gaussian apparatus and method for the case of a desired signal with unknown amplitude.

Referring to FIGS. 2 and 3, U.S. Pat. No. 5,640,429 to Michels et al. teaches detection architecture for a signal whose amplitude is known (FIG. 2) or unknown (FIG. 3). The estimation of the unknown amplitude, however, is not directly incorporated into the detection procedure. Rather, an estimate of the signal amplitude is first obtained where R is the estimate of the disturbance covariance matrix. This estimate is obtained by first forming a J N×J N covariance matrix at each range ring from the observed J N×1 data vector (containing J channels and N pulses) and then averaging these estimates over the secondary data range cells. Specifically, $$\hat{R} = \frac{1}{K} \sum_{k=1}^{K} \underline{X}_k \underline{X}_k^H$$

where H is the Hermitian transpose operation and $\underline{X}_k$ is the secondary data vector for the kth range cell. Since R is a JN×JN matrix, it requires a secondary data sample support size greater than J N to prevent ill-conditioning. This estimate of signal amplitude requires a much larger number of secondary data cells for acceptable performance than does the present invention.

In the present invention, the unknown disturbance correlation is again estimated from the secondary data by means of parametric adaptive estimation algorithms. However, the signal amplitude estimate is now embedded directly into the detection test statistic. Thus the large covariance matrix estimate that requires approximately 2 J N range cells is no longer necessary. The result is that high detection performance can be achieved with a very low number of range cells.

In the discussion that follows, we choose an autoregressive ("AR") time series model as representative of an LPM implementation. (Another time series model or a state space model can be used instead.). For clarification, we review the related subject of linear prediction, which is well known in the prior art.

Linear Prediction

To understand the present invention, we offer a brief description of linear prediction as applied to the present invention. Consider the J×1 data vector $x_k(n)$ from the kth range ring at time n. We define the order M, zero mean, linear prediction estimate $\hat{x}_k(n|n-1)$ of $x_k(n)$ from past values of $x_k(n)$ as $$\hat{x}(n|n-1) = -\sum_{m=1}^{M} A_{M,k}^H(m) \underline{x}_k(n-m)$$

The corresponding prediction error is therefore, $$\underline{\varepsilon}_k(n) = \underline{x}_k(n) - \hat{\underline{x}}_k(n|n-1).$$

Thus $\underline{\varepsilon}_k(n)$ can be expressed as the output of a multi-channel prediction error filter of order P expressed as $$\underline{\varepsilon}_k(n) = \sum_{p=0}^{P} A_{P,k}^H(p) \underline{x}(n-p)$$

where $A_{P,k}^H(p)$ is a J×J matrix coefficient, A(0)=I is the J×J identity matrix, and $\underline{x}(n)$ is the input data process. The coefficients $A_{P,k}^H(p)$ are chosen to minimize the mean-square error $E[|\underline{\varepsilon}_k(n)|^2]$ of $\underline{\varepsilon}_k(n)$. In this case, $\underline{\varepsilon}_k(n)$ is an error residual that is whitened in time (and partially across channels). The remaining cross-channel correlation is expressed by the kth range cell prediction error covariance matrix $\Sigma_{\varepsilon,k}$, expressed as $$\Sigma_{\varepsilon,k} = E[\underline{\varepsilon}_k(n) \underline{\varepsilon}_k^H(n)].$$

The diagonalization of $\Sigma_{\varepsilon,k}$ will further decorrelate $\varepsilon_k(n)$ across channels. This diagonalization can be carried out by any of several Hermitian matrix factorizations. Foremost among them are Cholesky factorization, LDU decomposition, and singular value decomposition ("SVD").

The Cholesky factorization of $\Sigma_{\varepsilon,k}$ is defined as $$\Sigma_{\varepsilon,k} = CC^H$$

where C is a J×J complex-valued, lower triangular matrix with non-zero elements along the diagonal. This factorization requires $\Sigma_{\varepsilon,k}$ to be non-singular.

The LDU decomposition of $\Sigma_{\varepsilon,k}$ is defined as $$\Sigma_{\varepsilon,k} = LDL^H$$

where L is a J×J complex-valued, lower triangular matrix with unity-valued elements along the main diagonal, and D is a J×J diagonal matrix with real-valued, non-negative diagonal entries. In this factorization, $\Sigma_{\varepsilon,k}$ can be rank-deficient, and the deficiency is manifested with a corresponding number of zeros along the main diagonal of D.

The SVD of $\Sigma_{\varepsilon,k}$ is defined as $$\Sigma_{\varepsilon,k} = USV^H$$

Hence the following error residuals are whitened both in time and across channels by one of the respective multiplying factors:

$$\Gamma_C(n) = C_k^{-1} \underline{\varepsilon}_k(n)$$

$$\Gamma_L(n) = L_k^{-1} \underline{\varepsilon}_k(n)$$

$$\Gamma_U(n) = U_k^{-1} \underline{\varepsilon}_k(n))$$

We call the factors $C_k^{-1}$, $L_k^{-1}$, and $U_k^{-1}$ spatial whitening coefficients. The selection of which coefficient to apply in a given physical environment depends on the rank deficiency of the error covariance matrix $\Sigma_{\varepsilon,k}$ and other numerical issues. In a preferred embodiment of the present invention, we apply the LDU-based $L_k^{-1}$ coefficient because it can be interpreted as an optimal spatial filter.

Similarly, linear prediction can be defined to operate on the time series in the backward direction to make a prediction of the sample $\underline{x}_k(n-m)$ as $$\hat{\underline{x}}_k(n-M|U_n) = -\sum_{m=1}^{M} B_{M,k}^H(m) \underline{x}_k(n-m+1)$$

where $U_n$ denotes the space spanned by $\underline{x}_k(n), x_k(n-1), \ldots, \underline{x}_k(n-m+1)$ and $B_{M,k}^H(m)$, m=1, 2, ..., M denotes the order M, J×J backward coefficients of linear prediction.

Multi-channel Linear Prediction Algorithms

As noted above, several multi-channel time series algorithms are available in the prior art. The Nuttall-Strand algorithm is summarized here as an example of an identification algorithm for a time-series LPM that estimates the multi-channel autoregressive ("AR") coefficients of the multi-channel tapped delay line and lattice prediction error filters.

a.) Initialization:

$$\underline{\varepsilon}_0(n) = \underline{\beta}_0(n) = \underline{x}(n)$$

$$\sum_0^f = \sum_0^b = \frac{1}{N} \sum_{n=1}^{N} \underline{x}(n) \underline{x}^H(n)$$

b.) Update the estimated Error Covariance Matrices:

$$\sum_p^f = \frac{1}{N} \sum_{n=p+2}^{N} \underline{\varepsilon}_p(n) \underline{\varepsilon}_p^H(n-1)$$

$$\sum_p^b = \frac{1}{N} \sum_{n=p+2}^{N} \underline{\beta}_p(n-1) \underline{\beta}_p^H(n-1)$$

$$\sum_p^{fb} = \frac{1}{N} \sum_{n=p+2}^{N} \underline{\varepsilon}_p(n-1) \underline{\beta}_p^H(n-1)$$

where the quantity $\underline{\beta}_p(n)$ denotes the backward prediction error for the pth order filter.

c.) Compute the Estimated Partial Correlation Matrix $\hat{\Delta}_{p+1}$:

$$(\hat{\Sigma}_p^f)(\Sigma_p^f)\hat{\Delta}_{p+1}+\hat{\Delta}_{p+1}(\Sigma_p^b)^{-1}(\hat{\Sigma}_p^b)=-2(\hat{\Sigma}_p^{fb})$$

d.) Update the Forward and Backward Reflection Coefficients:

$$A_{p+1}[p+1]=-\hat{\Delta}_{p+1}(\Sigma_p^b)^{-1}$$

$$B_{p+1}[p+1]=-\hat{\Psi}_{p+1}(\Sigma_p^f)^{-1}$$

$$\hat{\Psi}_{p+1}=\hat{\Delta}_{p+1}{}^H$$

e.) Update the Forward and Backward Error Covariance Matrices:

$$\Sigma_{p+1}^f=\Sigma_p^f+A_{p+1}[p+1]\hat{\Psi}_{p+1}$$

$$\Sigma_{p+1}^b=\Sigma_p^b+B_{p+1}[p+1]\hat{\Delta}_{p+1}$$

f.) Update the Forward and Backward Prediction Errors:

$$\underline{\epsilon}_{p+1}(n)=\underline{\epsilon}_p(n)+A_{p+1}\underline{\beta}_p(n-1)$$

$$\underline{\beta}_{p+1}(n)=\underline{\beta}_p(n-1)+B_{p+1}[p+1]\underline{\epsilon}_p(n)$$

This procedure is repeated until the specified order P is reached. We define the final Pth order forward and backward AR coefficients as $\hat{A}_P^H(m)$ and $\hat{B}_P^H(m)$ for m=1, 2, ..., P, respectively and the forward and backward prediction error parameters as $\hat{\Sigma}_P^f$ and $\hat{\Sigma}_P^b$, respectively.

Normalized Parametric Adaptive Matched Filter (N-PAMF)

The normalized parametric adaptive matched filter which includes implicit amplitude estimation and accommodation of Gaussian and non-Gaussian disturbance described in the present invention is depicted in FIG. 6. We first describe two parameter estimations common to all embodiments. The first step is to select an algorithm to estimate the LPM parameters in filter parameters 107. For the time series AR LPM, the Nuttall-Strand algorithm is a good candidate. This algorithm is applied to secondary data $\underline{x}(n|H_0)$ 203 from a host system 100. Thus the order P parameter estimates $\hat{A}_{P,k}^H(m)$ and $\hat{B}_{P,k}^H(m)$ for m=1,2, ..., P are obtained at each range cell k, for k=1, 2, ..., K, with filter order P chosen either by the user or by a model order selection method (Aiaike, H., "Power Spectrum Estimation through Autoregressive Model Fitting," Ann. Inst. Statist. Math., vol. 21, pp. 407–419, 1969). These estimates are averaged over K range rings to obtain the averaged estimates $\hat{A}_P^H(m)$ and $\hat{B}_P^H(m)$, m=1, 2, ..., P.

To obtain the forward and backward prediction error power parameters, we use one of two methods. In method A, the estimates $\hat{\Sigma}_{P,k}^f$ and $\hat{\Sigma}_{P,k}^b$ are obtained along with the estimates $\hat{A}_{P,k}^H(m)$ and $\hat{B}_{P,k}^H(m)$ for m=1, 2, ..., P at each range cell k, for k=1, 2, ..., K by the Nuttall-Strand algorithm. As with the estimates $\hat{A}_{P,k}^H(m)$ and $\hat{B}_{P,k}^H(m)$, $\hat{\Sigma}_{P,k}^f$ and $\hat{\Sigma}_{P,k}^b$ are averaged over the K range rings to obtain the averaged estimates $\hat{\Sigma}_P^f$ and $\hat{\Sigma}_P^b$.

Figure 5A:
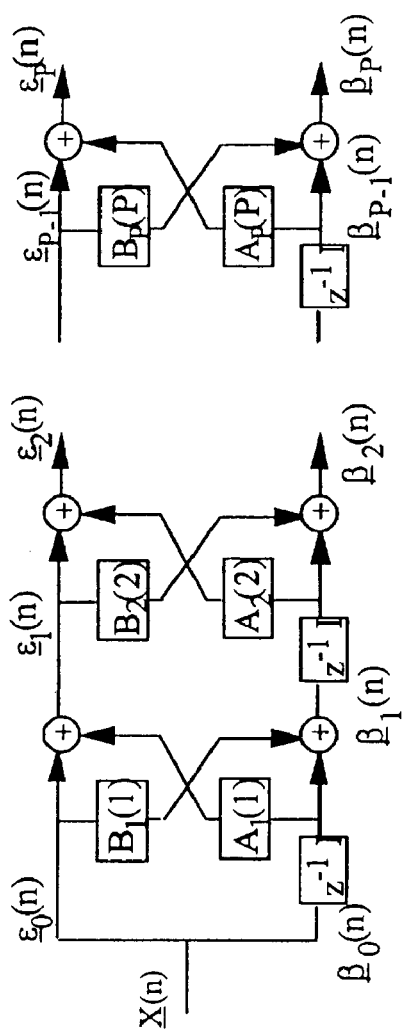
FIG. 5A shows a multi-channel lattice linear prediction error filter with J×J matrix coefficients (J channels) processing the observation data vector of FIG. 4A.
Figure 5B:
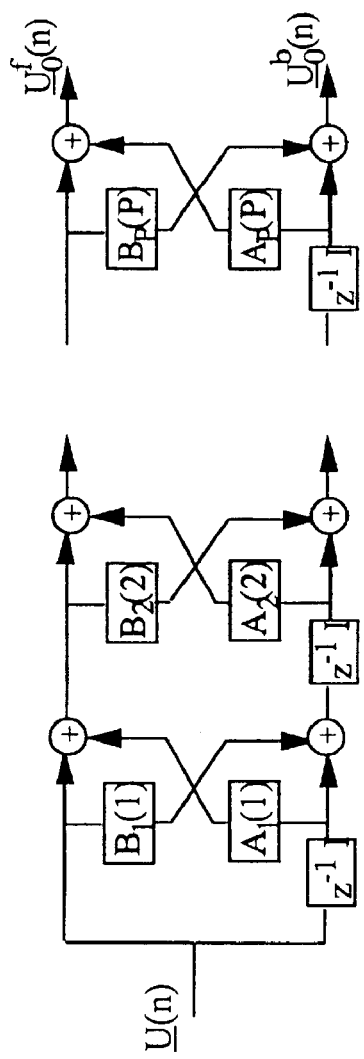
FIG. 5B shows the filter of FIG. 5A rotating the known signal steering vector of FIG. 4B.

In method B, we first obtain the temporal forward and backward residual error vectors, $\underline{\epsilon}_k(n)$ and $\underline{\beta}_k(n)$ respectively, at time n for the kth secondary data cell using either the tapped delay line prediction error filter, shown in FIG. 4A (filtering of the steering vector is depicted in FIG. 4B), with forward coefficients $\hat{A}_P^H(m)$, m=1, 2, ..., P or the lattice prediction error filter, shown in FIG. 5A (filtering of the steering vector is depicted in FIG. 5B), with forward and backward coefficients $\hat{A}_P^H(m)$ and $\hat{B}_P^H(m)$ respectively, where m=1, 2, ..., P. Then we compute an estimate of the Pth order forward and backward error covariance matrices for the kth range cell by averaging over N time pulses to obtain $$\hat{\Omega}_{P,k}^f = \frac{1}{N}\sum_{n=1}^{N}\underline{\epsilon}_k(n)\underline{\epsilon}_k^H(n) \text{ (time averaging) and}$$

$$\hat{\Omega}_{P,k}^b = \frac{1}{N}\sum_{n=1}^{N}\underline{\beta}_k(n)\underline{\beta}_k^H(n) \text{ (time averaging)}$$

Next we average these estimates over the K range cells using $$\hat{\Omega}_P^f = \frac{1}{K}\sum_{k=1}^{N}\hat{\Omega}_{P,k}^f \text{ (ensemble averaging) and}$$

$$\hat{\Omega}_P^b = \frac{1}{K}\sum_{k=1}^{N}\hat{\Omega}_{P,k}^b \text{ (ensemble averaging)}$$

Preliminary testing has revealed that method B provides a performance result with a constant false alarm rate ("CFAR"). This rate implies that the threshold to set a specified probability of a false alarm is fixed and does not vary as a function of the underlying disturbance correlation.

Subsequently, the respective forward and backward estimated error covariance matrices for either method A, $\hat{\Sigma}_P^f$ and $\hat{\Sigma}_P^b$, or method B, $\hat{\Omega}_P^f$ and $\Omega_P^b$, are decomposed using one of Cholesky factorization, LDU decomposition, or SVD. For simplicity, we focus only on the forward estimated error covariance matrix, $\hat{\Sigma}_P^f$, obtained from the tapped delay line based prediction error filter. Using LDU decomposition, we solve the equation $\hat{\Sigma}_P^f=\hat{L}_0\hat{D}_0\hat{L}_0^H$ to obtain $\hat{L}_0$ and $\hat{D}_0$ (where the subscript denotes that $H_0$ data was used). $\hat{D}_0$ will hereafter be called a diagonal matrix coefficient 215. The parameters $\hat{A}_P^H(p)$, p=1, 2, ..., P, and $\hat{L}_0$ are used in the whitening filter 115 shown in FIG. 4A.

The primary data residual $\underline{\Gamma}_0(n)$ 223 is obtained by inputting $\underline{x}(n|H_1)$ primary or test cell data 211 to the whitening filter 115. Thus $\underline{\Gamma}_0(n)$ is expressed as $$\underline{\Gamma}_0(n) = \hat{L}_0^{-1}\underline{\epsilon}(n) = \hat{L}_0^{-1}\left[\underline{x}(n) + \sum_{k=1}^{P}\hat{A}(k)\underline{x}(n-k)\right], \text{ where } n = 1, 2, ..., N$$

The whitening filter must be back-filled to prevent a transient initial response. This back filling requires P time pulses from the sequence of N pulses. Thus N−P pulses are available for further processing.

The steering vector residual $\underline{U}_0(n)$ 219 is computed by inputting the time-sequential form of the steering vector $\underline{U}_0(n)$ to the whitening filter 115, as shown in FIG. 4B. Thus $\underline{U}_0(n)$ is expressed as $$\underline{U}_0(n) = \begin{bmatrix} U_{01}(n) \\ U_{02}(n) \\ \vdots \\ U_{0J}(n) \end{bmatrix} = \hat{L}_0^{-1}\left[U(n) + \sum_{k=1}^{P}\hat{A}(k)U(n-k)\right], \text{ for } n = 1, 2, ..., N$$

where $\underline{U}(n)=\underline{U}\exp\{j2\pi(n-1)\overline{\omega}_t\}$, and the spatial steering vector $\underline{U}$ is defined as $$U = \begin{bmatrix} 1 \\ \exp[j2p\theta_t] \\ \exp[j2p2\theta_t] \\ \ldots \\ \exp[j2p(J-1)\theta_t] \end{bmatrix}$$

The quantities $\bar{\omega}_t$ and $\theta_t$ are respectively the normalized Doppler and the spatial frequencies of the desired signal. Varying $\bar{\omega}_t$ and $\theta_t$ through the range between −0.5 and +0.5, enables the angle-Doppler space to be searched for the presence of the signal.

Calculation of the Normalized Parametric Adaptive Matched Filter

With reference to FIG. 6, a functional block diagram of the calculations for the normalized parametric adaptive matched filter, the host computer 100 provides the secondary data 203 for the estimation of the filter parameters in block 107. The primary data 211 and steering vector data 207 are provided to the linear prediction error filter 115. Parameters 213 estimated for this filter are generated in block 107. Block 107 also outputs a diagonal matrix coefficient 215 obtained from the LDL decomposition of the residual covariance matrix. The linear prediction filter 115 outputs the filtered steering vector 219 and the filtered primary data 223. Diagonal matrix coefficient 215 along with filtered outputs 219 and 223 are used in block 124 to calculate the test statistic 230. This statistic is compared to a pre-stored threshold test 144 to decide the presence or absence of a target. Modification of the test statistic $\Lambda_{GPAMF}$ in U.S. Pat. No. 6,226,321

$$\Lambda_{GPAMF} = \frac{\left| \sum_{n=1}^{N} \underline{U}_0^H(n) \hat{D}_0^{-1} \underline{\Gamma}_0(n) \right|^2}{\sum_{n=1}^{N} \underline{U}_0^H(n) \hat{D}_0^{-1} \underline{U}_0(n)}$$

Using the available 215, 219, and 213, results in the present invention. This invention is termed the normalized parametric adaptive matched filter (N-PAMF) with the test statistic $\Lambda_{NPAMF}$ $$\Lambda_{NPAMF} = \frac{\left| \sum_{n=1}^{N-P} \underline{U}_0^H(n) \hat{D}_0^{-1} \underline{\Gamma}_0(n) \right|^2}{\left[ \sum_{n=1}^{N-P} \underline{U}_0^H(n) \hat{D}_0^{-1} \underline{U}_0(n) \right] \left[ \sum_{n=1}^{N-P} \underline{\Gamma}_0^H(n) \hat{D}_0^{-1} \underline{\Gamma}_0(n) \right]}$$

The above equation for the N-PAMF test statistic corresponds to equations (3.4) and (7) in references A and B, respectively. For reference in the claims below, this test statistic comprises a numerator having a squared first quadratic term and a denominator that is the product of a second and third quadratic term.

Performance Comparisons with Related Test Statistics

For the purpose of comparing the N-PAMF test statistic with related test statistics, the following In this paper, we consider the hypothesis testing problem on a complex (baseband) measurement (test data) vector $x \in C^{JN}$ with J channels and N time pulses. The data vector contains an unwanted additive disturbance d with unknown covariance $R_d$, and may contain a desired signal ae with unknown complex amplitude 'a' and known signal steering vector e. The binary detection problem is to select between hypothesis $H_0$: a=0 and $H_1$: a≠0, given a single realization of x.

Current research addresses the detection problem wherein d contains partially-correlated clutter described by a compound product model as described in the paper by K. Yao, "A representation theorem and its applications to spherically invariant random processes," *IEEE Trans. on Info. Theory*, IT-19, pp. 600–608, September 73. Here, non-homogeneous Gaussian clutter is modeled with random power variations (scale changes) distributed spatially over the radar backscatter process. This model is the basis of the spherically invariant random process (SIRP) clutter model. As special cases, it yields recognized clutter models such as the Weibull and K distributions.

CFAR detectors operating in SIRP noise were originally considered in the paper by R. L. Spooner, "On the detection of a known signal in non-Gaussian noise process", *J. Acoust. Soc. Amer.*, vol. 44, pp. 141–147, January 1968 and the paper by G. Vezzozi, B. Picinbono, "Detection d'un signal certain dans un bruit spheriquement invariant, structure et characteristiques des recepteurs," *Ann. Telecommun.*, vol. 27, pp. 95–110, 1972. Recently, a generalized likelihood ratio test (GLRT) was considered independently in the paper by E. Conte, M. Lops, G. Ricci, "Asymptotically optimum radar detection in compound-Gaussian clutter," *IEEE Trans. on AES*, AES-31, pp. 617–625, April 1995 and the paper by F. Gini, "Sub-optimum coherent radar detection in a mixture of K-distributed and Gaussian clutter," *IEE Proceedings. Part-F*, vol. 144, No.1, pp. 39–48, February 1997. Gini obtained the GLRT by maximizing the likelihood ratio (LR) with respect to unknown signal amplitude and clutter texture power. The resulting test is referred to here as the normalized adaptive matched filter (NAMF). In the paper by S. Kraut, L. T. McWhorter, L. L. Scharf, "A canonical representation for the distributions of adaptive matched subspace detectors", $31^{st}$ *ASILOMAR Conf. on Sig., Sys., and Comp.*, Pacific Grove, Calif., 1997, hypothesis testing was considered with only test data scaled by an unknown parameter, η. In SIRP clutter, interference from all data cells is scaled by a random parameter. The important feature of the NAMF test is its capability to minimize dependence upon texture power.

Another approach considered the use of a model-based method described in the paper by M. Rangaswamy, J. H. Michels, "A parametric multichannel detection algorithm for correlated non-Gaussian random processes", *IEEE Nat. Radar Conf.*, pp. 349–354, Syracuse, N.Y., May 1997, named the non-Gaussian parametric adaptive matched filter (NG-PAMF). The method was derived as a GLRT by maximizing the LR of unconditional SIRP densities with respect to the unknown signal amplitude. However, the resulting test statistic contains functional forms dependent upon knowledge of the clutter density distribution.

Following is an analysis of the performance of the present invention, the N-PAMF receiver, and its comparison to other receivers. Its form is the model-based version of the NAMF. Unlike the NG-PAMF, the N-PAMF test requires no 'a priori' knowledge of the disturbance statistics. This feature is important in real-time applications where such information is lacking. We focus here on probability of detection ($P_d$) and false alarm ($P_{fa}$) performance robustness over a broad range of clutter K-distribution shape parameters α ranging from Gaussian (α=∞) to high-tailed probability density functions (pdf) (α=0.1). These considerations enable assessments of constant false alarm rate (CFAR) performance with respect to the amplitude probability density function (apdf) associated with clutter texture variations. Finally, we examine performance versus data sample support size used for disturbance estimation. This issue is of considerable importance for non-homogeneous clutter where representative secondary data cells are limited to a small set located immediately adjacent to the test cell.

Clutter Model

The single channel scalar complex envelope $c_k(n)$ at time n and kth data cell of the compound-Gaussian clutter is expressed as $$c_k(n) = v_k(n) g_k(n)$$

with complex Gaussian process $g_k(n)$ (speckle component) modulated by a non-negative process $v_k(n)$ (texture component) independent of $g_k(n)$ (see E. Conte, G. Ricci, "Performance prediction in compound-Gaussian clutter," *IEEE Trans. on AES*, Vol. 30, No. 2, April 1994). When $v_k(n)$ has long temporal coherence, it is a random variable over k, but constant over time. Thus, the above equation reduces to the representation theorem for an SIRP (see K. Yao, "A representation theorem and its applications to spherically invariant random processes," *IEEE Trans. on Info. Theory*, IT-19, pp. 600–608, September 73) as $$c_k(n) = v_k g_k(n).$$

Thus, each of the J channels has output as in this equation.

The probability density function (pdf) $f_v(v)$ is the characteristic pdf. When $f_v(v)$ is the Gamma distribution, the amplitude of $c_k(n)$ has a K-distribution which includes the Gaussian model ($\alpha = \infty$) as a special case; i.e., the disturbance d contains partially correlated clutter c modeled with K-distributed amplitude, $$f_R(r) = \frac{\beta^{\alpha+1} r^\alpha}{2^{\alpha-1} \Gamma(\alpha)} K_{\alpha-1}(\beta r); \; r \geq 0; \; \beta, \alpha > 0$$

where $\beta$ and $\alpha$ are, respectively, the distribution scale and shape parameters, $K_\xi(\bullet)$ is the modified Bessel function of the second kind with order $\xi$, and $\Gamma(\bullet)$ is the Eulero-Gamma function. $\beta$ relates to the clutter quadrature component variance, while $\alpha$ controls the distribution tails.

For the airborne radar problem, we consider the sub-script k to be associated with the kth range cell. From $c_k(n) = v_k(n) g_k(n)$, the clutter covariance matrix is $R_c = E[v_k^2] R_g$ where $R_g \in C^{JN \times JN}$ is the covariance of the Gaussian (speckle) component and $E[v_k^2]$ relates to the texture power. In summary, this model considers each range ring as conditionally Gaussian with fixed variance. However, the variance varies according to the Gamma distribution over range rings.

In practice, $R_d$ is unknown and must be estimated from a secondary data set $\{z\}$ considered 'signal free' and assumed statistically independent and identically distributed (iid) to x. For Gaussian disturbance, the maximum likelihood (ML) estimator is the sample matrix $$\hat{R}_d = \frac{1}{K} \sum_{k=1}^{K} z_k z_k^H.$$

For compound-Gaussian disturbance characterized by the presence of clutter spikes over range cells, $\hat{R}_d$ is no longer a ML estimator. Error variance analyses of $\hat{R}_d$ and a normalized variant of $\hat{R}_d$ are considered for compound-Gaussian disturbance in [16] wherein analytic expressions are presented in terms of the texture power variations. The effect on $P_d$ using these estimators is discussed in the paper by E. Conte, M. Lops, G. Ricci, "Adaptive detection schemes in compound-Gaussian clutter," *IEEE Trans. on AES*, vol. 34, no. 4, pp. 1058–1069, October. 1998.

Test Statistic Descriptions

Now will be considered several detection tests involving phase and gain invariance and refer the reader to pertinent references. For known $R_d$, the phase invariant matched filter (PI-MF) test is expressed as (see S. Kraut, L. T. McWhorter, L. L. Scharf, "A canonical representation for the distributions of adaptive matched subspace detectors", 31$^{st}$ ASILOMAR Conf. on Sig., Sys., and Comp., Pacific Grove, Calif., 1997 and L. L. Scharf, "Geometries, invariances, and SNR interpretations of matched and adaptive subspace detectors", *Colloque Bernard Picinbono*, CNRS, Paris, France, 19 May 1999)

$$\Lambda_1 = \frac{|e^H R_d^{-1} x|^2}{\eta^2 e^H R_d^{-1} e} \begin{array}{c} H_1 \\ > \\ < \\ H_0 \end{array} \lambda_1 \quad \text{PI-MF}$$

where e and x are the concatenated JN×1 signal 'search' steering and data vectors, respectively. The inner product of whitened vectors $b = R_d^{-1/2} x$ and $f = R_d^{-1/2} e$ is the matched filtering operation. Although PI-MF statistic does not require knowledge of signal phase, it does require knowledge of the scale $\eta$ to be CFAR. For $\eta=1$, $\Lambda_1$ was developed independently in the references by L. Cai, H. Wang, "On adaptive filtering with the CFAR feature and its performance sensitivity to non-Gaussian interference," 24$^{th}$ Conf. on Info. Sci. and Sys., Princeton University 21–23 Mar., 1990, W. S. Chen, I. S. Reed, "A new CFAR detection test for radar," Dig. Sig. Proc., pp. 198–214, October 1991, and F. C. Robey, D. R. Fuhrmann, E. J. Kelly, R. Nitzberg, "A CFAR adaptive matched filter detector," *IEEE Trans. on AES*, pp. 208–216, January 1992 where its CFAR behavior was noted. This property is lost when $\eta \neq 1$.

The normalized matched filter (NMF) test (see S. Kraut, L. T. McWhorter, L. L. Scharf, "A canonical representation for the distributions of adaptive matched subspace detectors", 31$^{st}$ ASILOMAR Conf. on Sig., Sys., and Comp., Pacific Grove, Calif., 1997) is expressed as $$\Lambda_2 = \frac{|e^H R_d^{-1} x|^2}{[e^H R_d^{-1} e][x^H R_d^{-1} x]} \begin{array}{c} H_1 \\ > \\ < \\ H_0 \end{array} \lambda_2. \quad \text{NMF}$$

For the adaptive problem, $\hat{R}_d$ replaces $R_d$ and the test statistics PI-MF and NMF are termed the PI-AMF and NAMF, respectively. We note that the NAMF is invariant to changes in gain between training and test data and has been noted to be CFAR for the problem of Gaussian disturbance with a scale change between test and training data (as shown in the above paper by Kraut et al.); i.e., under $H_1$, x~CN (ae,$\eta^2 R_d$), while the training data z~CN(0,$R_d$). Thus, the variances of the training and test data differ by the factor $\eta^2$. In this paper, we consider its performance in the more general problem involving the compound-Gaussian clutter model with power or scale changes over all range cells. No optimality claims of the NAMF test can be made for the case of SIRP disturbance.

For these tests, the whitening operation $R_d^{-1/2}$ transforms the signal and data vectors to obtain b and f as noted above. For multichannel parametric methods (J. H. Michels, "Multi-channel detection using the discrete-time model-based innovations approach", Ph.D. dissertation, Syracuse University, Syracuse, N.Y., May, 1991; also RL-TR-91-269, Aug. 1991), the whitening operation is performed through the use of prediction error filters (PEF) using time series or state space architectures. We define $y_p(n)$ as the J×1 vector error residual output of a Pth-order multichannel linear filter. For a multi-channel autoregressive model, a tapped delay line architecture is used where the Pth order filter coefficients are estimated using the secondary data processes $\{z_k\}$ and a multi-channel parameter estimation algorithm. These coefficients contain the disturbance correlation description in compact form. Specifically, $$y_p(n) = \hat{D}_0^{-1/2} \hat{L}_0^{-1} u_p(n)$$

$$= \hat{D}_0^{-1/2} \hat{L}_0^{-1} [z(n|H_1) + \sum_{k=1}^{P} \hat{A}(k)z(n-k+P|H_1)]$$

$$n = 0, 1, \ldots, N-P-1$$

where the above equation implicitly defines the temporally whitened J×1 error vector residual $u_p(n)$ with covariance $\Sigma_u$. The $LDL^H$ decomposition of $\hat{\Sigma}_u$ yields ($\hat{L}_0$, $\hat{D}_0$) which are used to spatially whiten $u_p(n)$ (see above referenced dissertation by J. H. Michels). Similarly, the transformed steering vector s(n) is obtained by sequencing the sequential form of the 'search' steering vector e(n) through the PEF; i.e., e(n) replaces z(n) in the above equation to obtain s(n). Hence the N-PAMF is defined as the parametric dual of the NMF. The definition of the N-PAMF test statistic with present nomenclature is repeated here for ease of reference $$\Lambda_{N\text{-}PAMF} = \frac{\left|\sum_{n=0}^{N-P-1} s^H(n)y_p(n)\right|^2}{\left[\sum_{n=0}^{N-P-1} s^H(n)s(n)\right]\left[\sum_{n=0}^{N-P-1} y_p^H(n)y_p(n)\right]}.$$

A related test, the parametric adaptive matched filter (PAMF), was first derived in the paper by M. Rangaswamy, J. H. Michels, "A parametric multichannel detection algorithm for correlated non-Gaussian random processes", *IEEE Nat. Radar Conf.*, pp. 349–354, Syracuse, N.Y., May 1997 for Gaussian disturbance. The PAMF test is identical to the N-PAMF test defined in the equation above but excludes the second bracketed denominator term. In the paper by J. R. Roman, et. al., "A parametric adaptive matched filter for airborne radar applications," *IEEE Trans. on AES*, Vol. 36, No. 2, April 2000, pp. 677–692 the Nuttall-Strand (NS) and Multichannel Least Squares (MLS) parameter estimation algorithms are considered with the PAMF. State space methods are considered in the paper by J. Roman, D. Davis, J. Michels, "Parametric-based space-time adaptive processing and detection in airborne surveillance radar systems", *Proceedings* 1998 *IASTED Int'l.* Conf. on Signal and Image Proc., Las Vegas, N.V., pp. 290–296, 28–31 October 1998.

Performance Results

Performance is now presented for the detectors described above. Probability of detection ($P_d$) is computed for $P_{fa}$=0.01 via Monte-Carlo using an airborne radar physical model. The target signal is located at normalized Doppler frequency $f_{dt}$=0.15 (unless otherwise stated) and azimuth $\phi$=0. The clutter ridge is positioned along the normalized angle-Doppler plane diagonal with a 40 dB (per pulse, per channel) clutter-to-noise ratio (CNR). The one-lag clutter temporal correlation parameter (see J. H. Michels, "Multichannel detection using the discrete-time model-based innovations approach", Ph.D. dissertation, Syracuse University, Syracuse, N.Y., May, 1991; also RL-TR-91-269, August 1991) is 0.999. Disturbance correlation estimates are obtained using K secondary data cells. The output signal-to-interference plus noise ratio is defined as SINR=$|a|^2 e^H R_d^{-1} e$.

Figure 7:
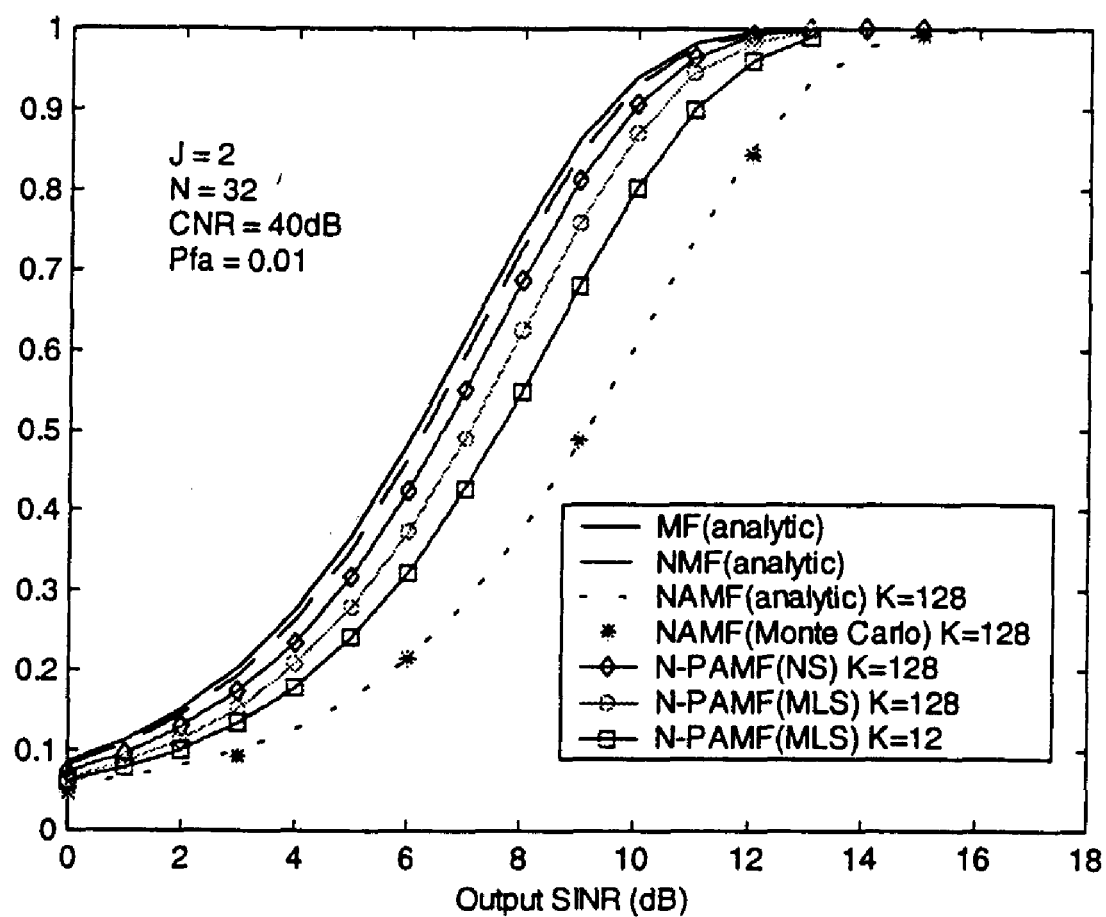
FIG. 7 shows the probability of detection versus output SINR in Gaussian disturbance for the matched filer (MF), the normalized matched filter (NMF), the normalized adaptive matched filter (NAMF), and the normalized parametric adaptive matched filter (N-PAMF) using the multichannel least squares (MLS) algorithm.

FIG. 7 shows $P_d$ versus output SINR for Gaussian disturbance with scale $\eta$=1 containing clutter plus thermal white noise. Shown here are analytic $P_d$ plots for the MF and NMF with known $R_d$ and represent upper bounds on performance for the adaptive versions of tests PI-MF and NMF, respectively. The analytic NAMF $P_d$ curve is also shown for K=128. Monte-Carlo generated $P_d$ results for the N-PAMF (NS), N-PAMF(MLS) and NAMF with K=128 are shown using ($\diamond$), (o) and (*), respectively. The later shows excellent agreement with the analytic values, thus validating the detection procedure. Finally, the N-PAMF(MLS) with K=12 is shown (!). As noted, the N-PAMF, using J=2, N=32 and P=3, achieves near optimal performance with K=128, and outperforms the NAMF with sample support as low as K=12.

Figure 8:
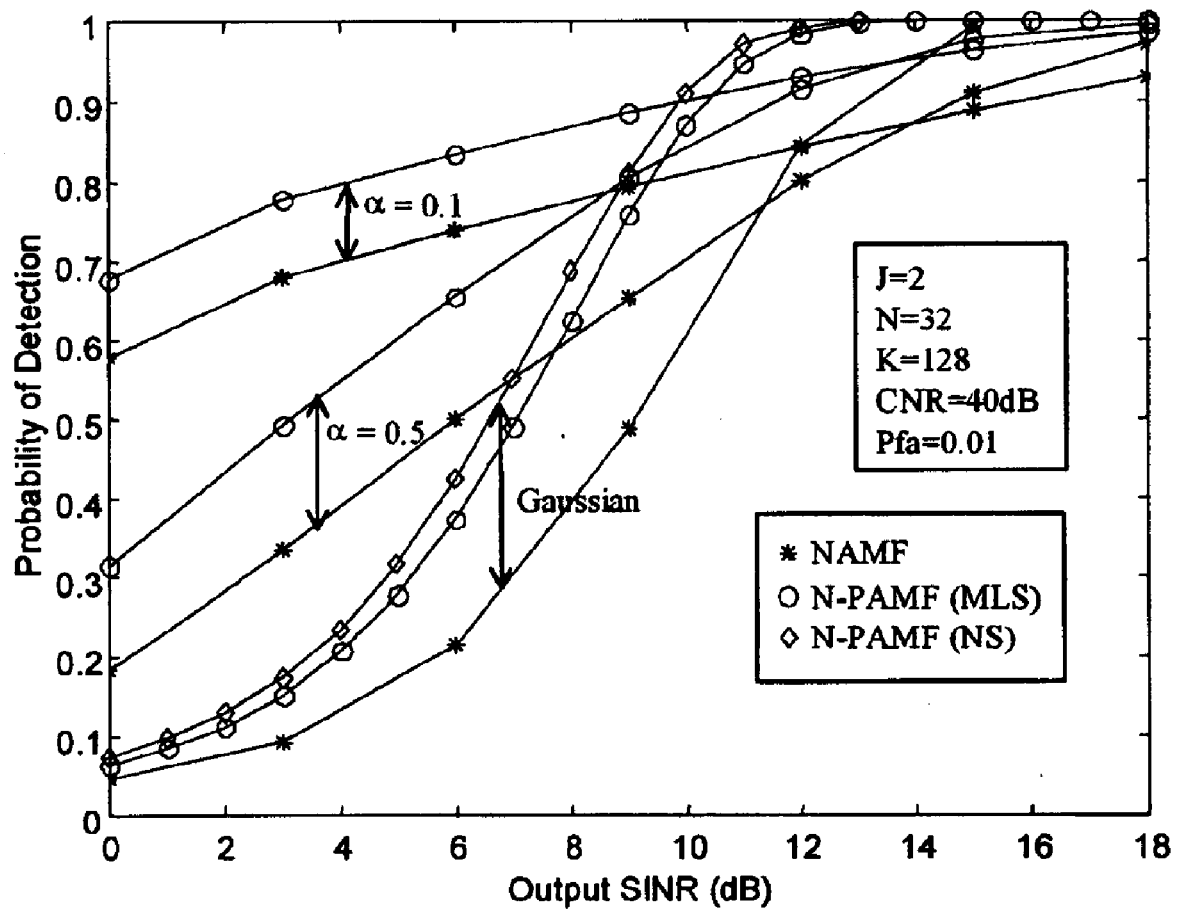
FIG. 8 shows the probability of detection versus output SINR for the NAMF, and the N-PAMF using both the Nuttall-Strand (NS) algorithm and the MLS algorithm, all for a range of clutter shape parameters ($\alpha$).

FIG. 8 displays $P_d$ versus output SINR for the NAMF and N-PAMF receivers for clutter processes with shape parameters $\alpha$=0.1, $\alpha$=0.5, and the Gaussian case ($\alpha$=$\infty$). Again, the superior performance of the N-PAMF is noted. For Gaussian processes, the N-PAMF(NS) provides superior performance to the N-PAMF(MLS), thus revealing the importance of the estimator. This figure also illustrates the potential for improved detection at lower SINR values when the disturbance is compound-Gaussian and appropriate detection methods are used.

Figure 9:
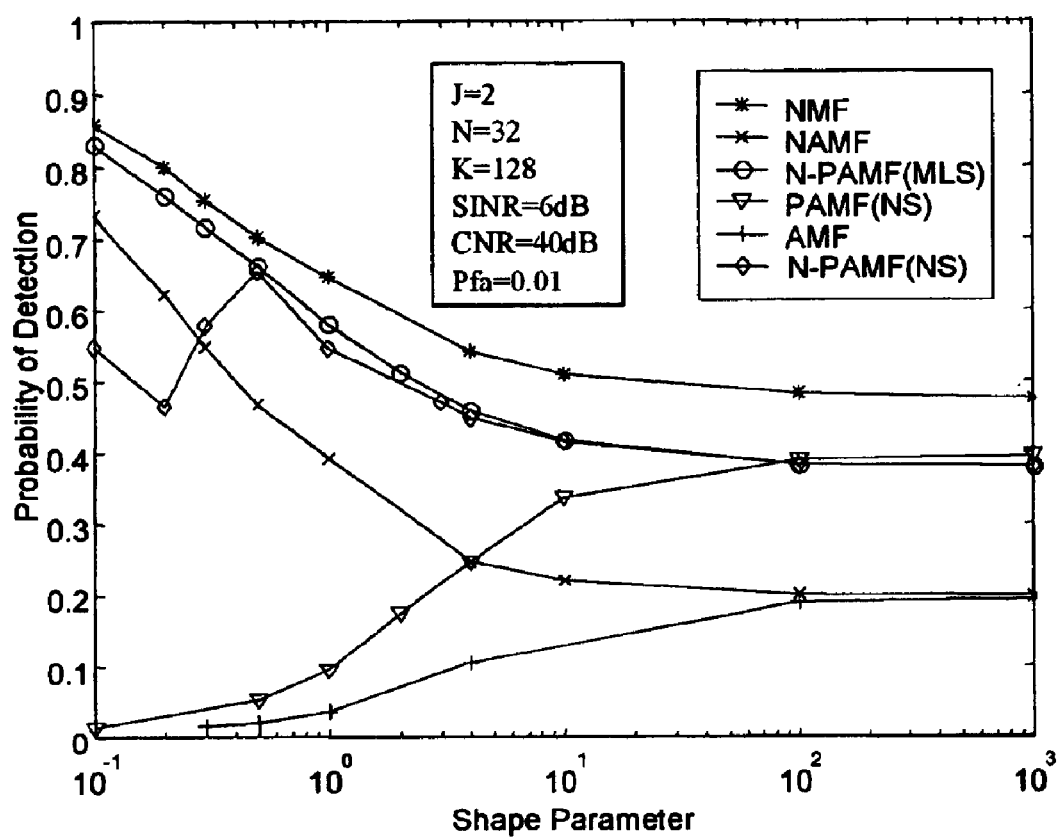
FIG. 9 shows the probability of detection versus clutter shape parameter ($\alpha$) for the NMF, N-PAMF(MLS), NAMF, PAMF(NS), AMF, and the N-PAMF(NS) receivers.

FIG. 9 plots $P_d$ versus the clutter shape parameter $\alpha$ at output SINR=6 dB with $\alpha$ ranging from 0.1 to 1,000. For the K-distribution, $\alpha$>4 approximates the Gaussian case. The results reveal the robustness of the N-PAMF and NAMF tests over a wide range of shape parameters. Further, the N-PAMF(MLS) shows significant performance improvement over the NAMF and approaches the NMF with known $R_d$. For $\alpha$<0.5, however, the N-PAMF(NS) suffers performance loss which merits further investigation. Performance of the PAMF and AMF are also shown. Clearly, these methods fail in non-Gaussian clutter.

Figure 10:
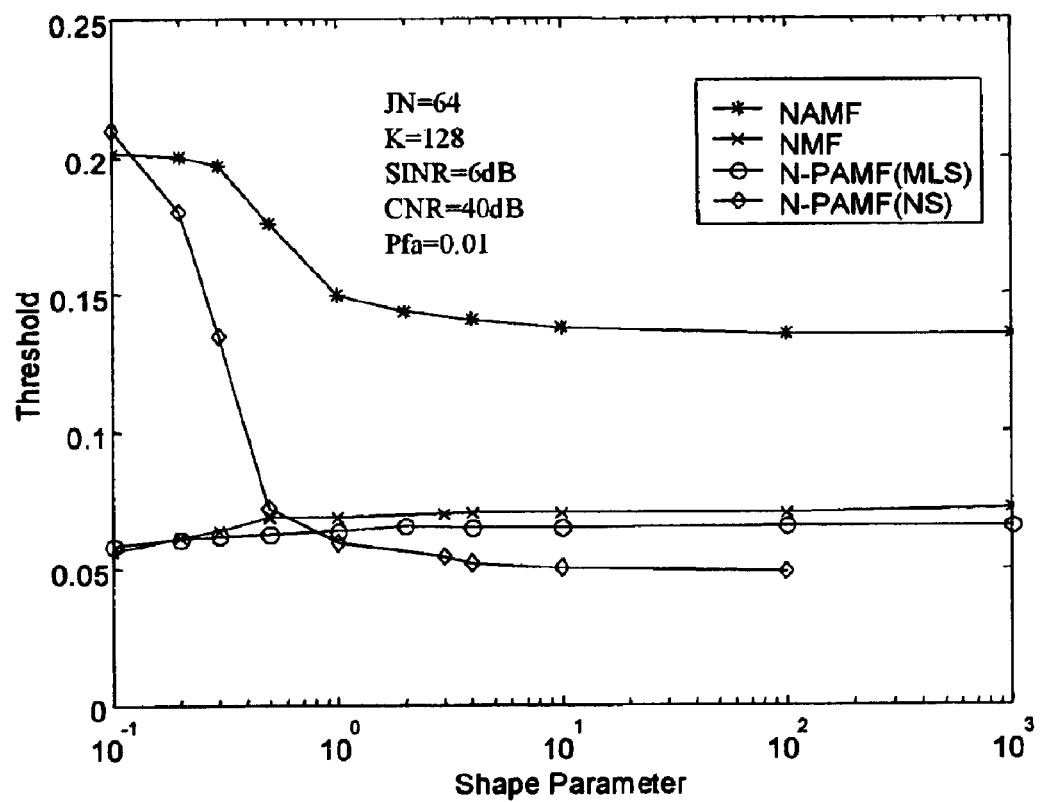
FIG. 10 shows threshold versus shape parameter ($\alpha$) in K-distributed clutter plus Gaussian white noise for the NMF, NAMF, N-PAMF(MLS), and N-PAMF(NS) receivers.

FIG. 10 provides additional insight regarding CFAR performance considerations. This figure plots the detection threshold versus shape parameter for the NMF, NAMF, N-PAMF(MLS) and N-PAMF(NS). Observe that the NAMF and N-PAMF(NS) thresholds increase with increasing texture power (decreasing $\alpha$). This implies a CFAR loss with respect to apdf. The N-PAMF(MLS), however, is nearly 'texture' CFAR for all shape parameters; i.e., its threshold is nearly invariant to changes in $\alpha$. Finally, for $P_{fa}$=0.01, the NMF threshold asymptotes to ~0.07 for large $\alpha$ (the Gaussian case) in agreement with the analytically determined value $\lambda$=1−exp(A) where A=1 n($P_{fa}$)/(JN−1)[9] for clutter dominated disturbance. For $\alpha$<1, however, the threshold decreases slightly, due to the additive white noise.

Figure 11:
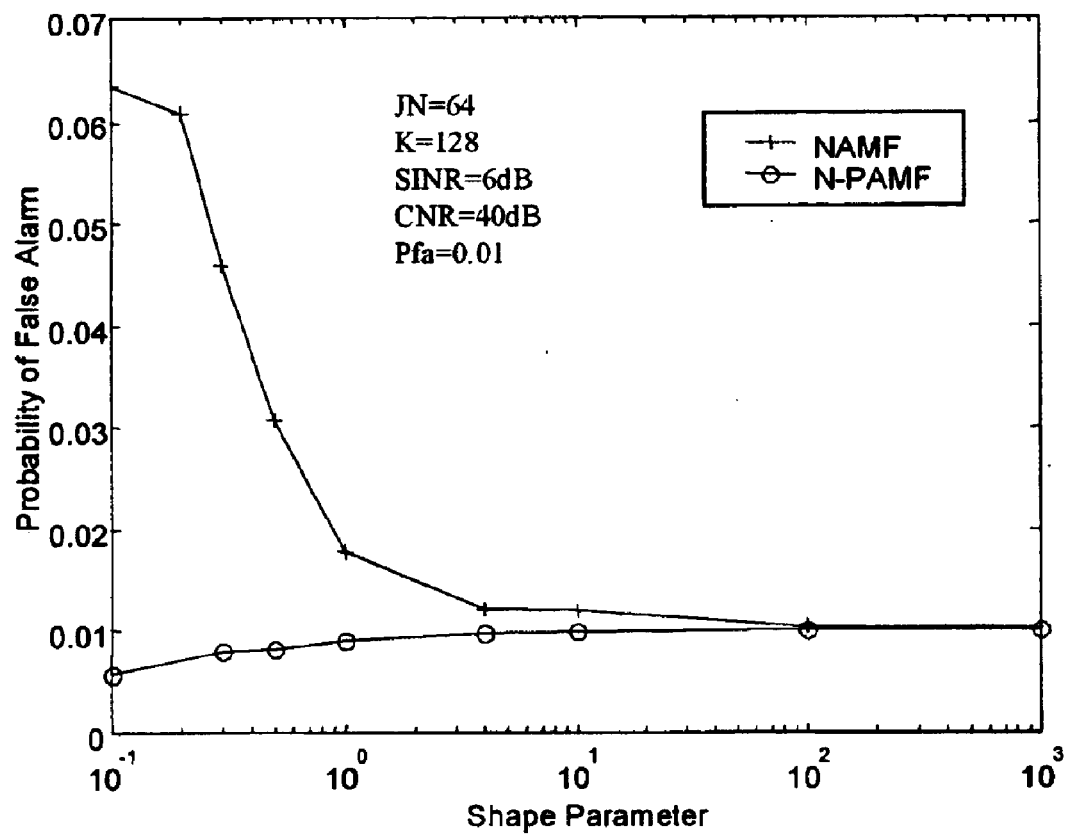
FIG. 11 shows the probability of false alarm (pfa) versus clutter shape parameter ($\alpha$) for NAMF and the N-PAMF (MLS) receivers with threshold fixed for pfa-0.01 in Gaussian disturbance.
Figure 12:
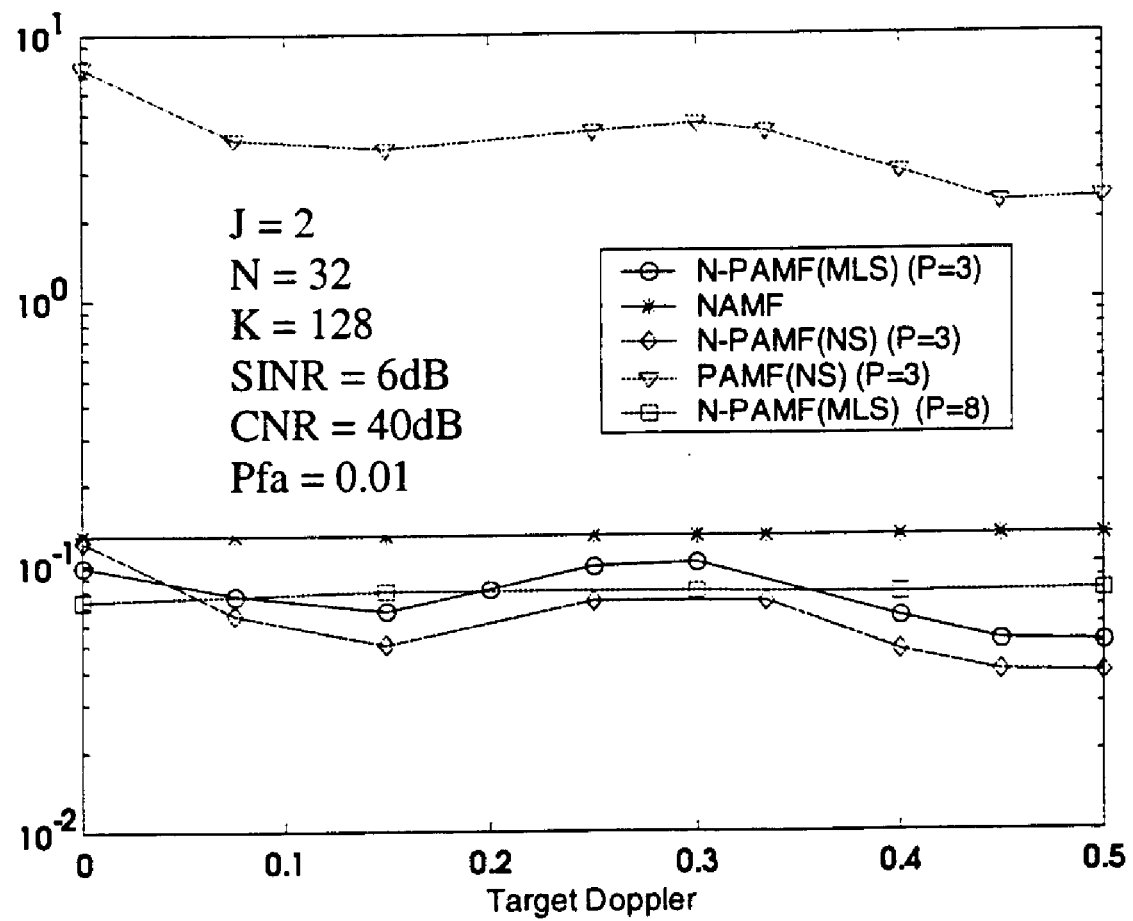
FIG. 12 shows threshold versus target Doppler for the NAMF, N-PAMF(MLS, P=3), N-PAMF(MLS, P=8), PAMF (NS), and N-PAMF(NS) receivers.

FIG. 11 shows $P_{fa}$ versus shape parameter $\alpha$ with each test statistic threshold held fixed to obtain $P_{fa}$=0.01 for Gaussian disturbance ($\alpha$=$\infty$). A six-fold variation in $P_{fa}$ for the NAMF confirms its lack of CFAR with respect to texture variations. In FIG. 12, however, we plot the threshold vs search vector Doppler position. Here, the NAMF threshold remains fixed over all Doppler, and the parametric tests suffer degraded CFAR for filter order P=3. For P=8, however, the CFAR performance is restored, albeit with some decrease in $P_d$. Thus, a tradeoff between exceptional $P_d$ and CFAR is controlled by model order and is an important topic for further research.

Figure 13:
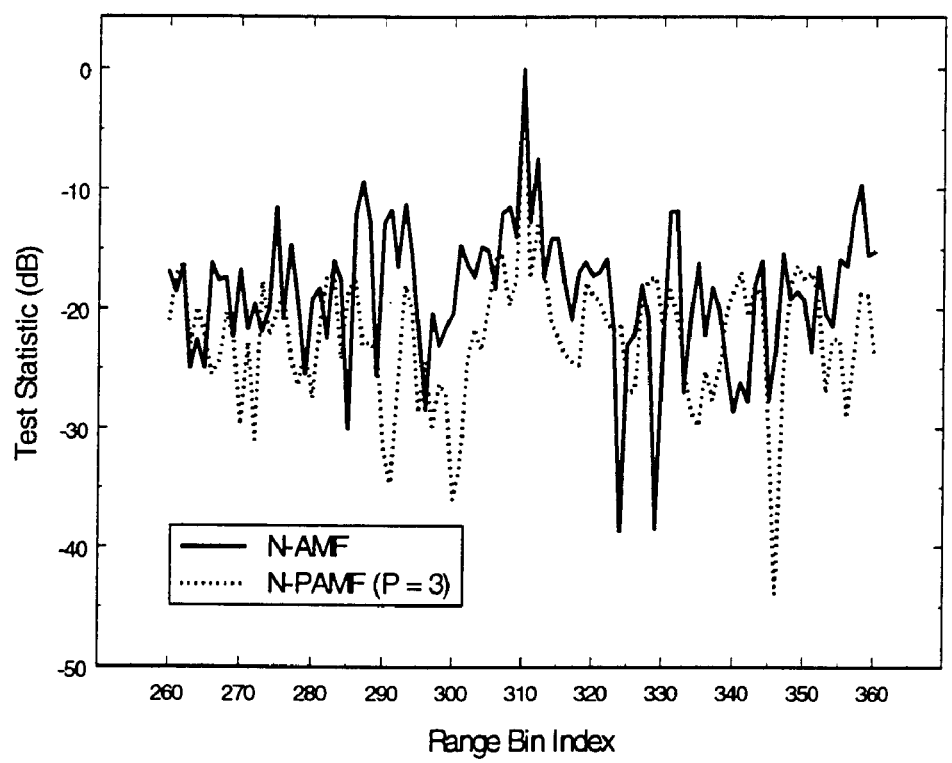
FIG. 13 shows the test statistic versus range for the N-PAMF(MLS) and NAMF receivers with J=8, N=32, P=3, and K=512.
Figure 14:
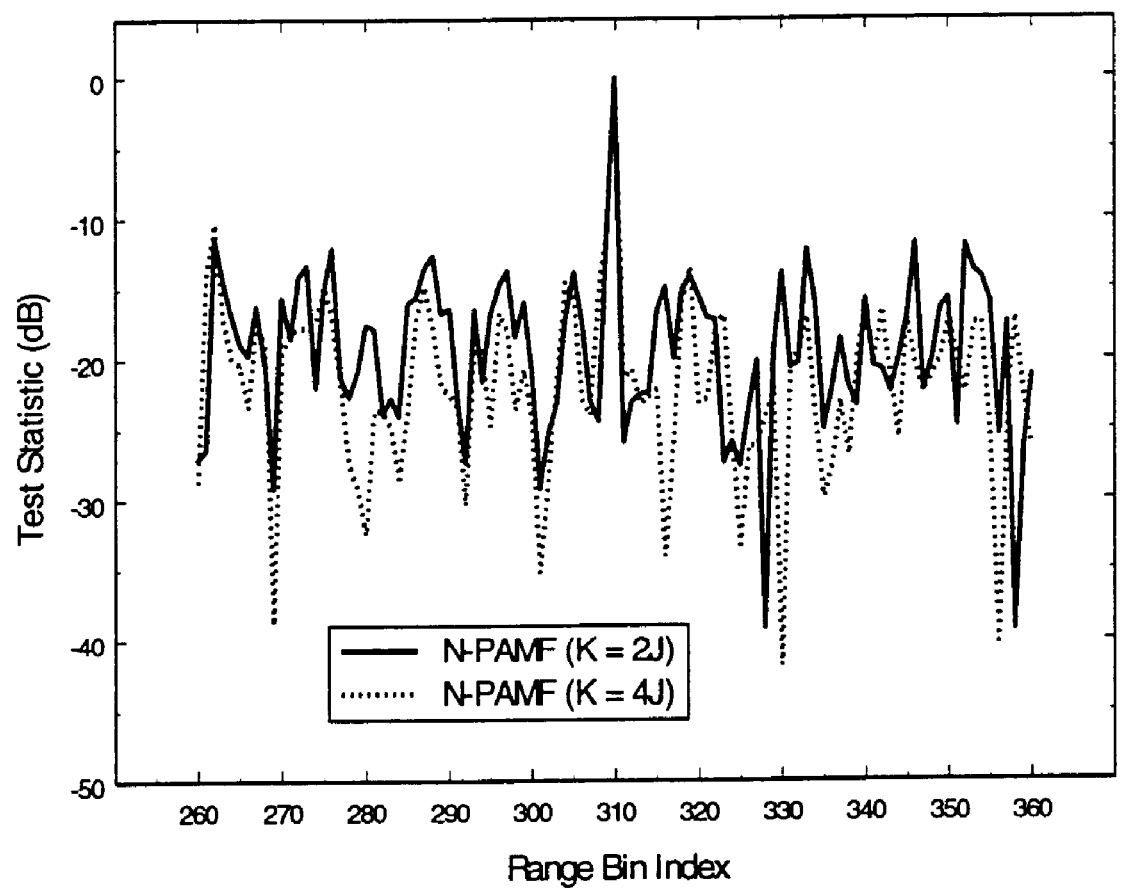
FIG. 14 shows the test statistic for the N-PAMF(MLS) receiver with J=8, N=32, P=2, for K=16 and K=32.

FIGS. 13 and 14 plot the test statistic vs range cell using data from the Air Force Research Laboratory (AFRL) Multichannel Airborne Radar Measurement (MCARM) program with an inserted target signal at range bin index 310. For the results here, J=8 and N=32. FIG. 13 plots the test statistics for the NAMF and N-PAMF(MLS) (order P=3) using K=512. FIG. 14 shows the N-PAMF(MLS) (P=2) using secondary data support sizes K=4J=32 and K=2J=16. We define the performance measure $\chi_1$ as the ratio of the signal peak to the mean disturbance, and $\chi_2$ as the ratio of the signal peak to the highest secondary data peak. The table below shows $\chi_1$ and $\chi_2$ for these results. Note that the N-PAMF performance with low model order (P=2) and small sample support (K=16) exceeds that of the NAMF with K=512.

|  | P | $\chi_1$ | $\chi_2$ |
| --- | --- | --- | --- |
| NAMF (K = 512) |  | 16.2 dB | 7.45 dB |
| N-PAMF (K = 512) | 3 | 20.4 dB | 13.00 dB |
| N-PAMF (K = 32) | 2 | 19.2 dB | 10.2 dB |
| N-PAMF (K = 16) | 2 | 17.2 dB | 10.7 dB |
| N-PAMF (K = 32) | 3 | 20.4 dB | 9.3 dB |
| N-PAMF (K = 16) | 3 | 18.4 dB | 8.8 dB |

What is claimed:

1. In a system for processing signals, a method for identifying presence or absence of at least one potential target comprising the steps of:

receiving from multiple channels signals corrupted by Gaussian or non-Gaussian disturbance;

partitioning said signals into secondary data having a low probability of containing said potential target and primary data to be assessed for the presence of said target;

estimating at least one linear filter parameter from said secondary data;

filtering at least one steering vector and said primary data with at least one whitening filter based on said at least one linear filter parameter to produce at least one steering vector residual and at least one primary data residual;

calculating a first quadratic term, said first quadratic term a function of said at least one steering vector residual, of said at least one linear filter parameter, and of said at least one primary data residual;

calculating a second quadratic term, said second quadratic term a function of said at least one steering vector residual and of said at least one linear filter parameter;

calculating a third quadratic term, said third quadratic term a function of said at least one primary data residual and of said at least one linear filter parameter;

calculating a test statistic as a function of said first, second and third quadratic terms; and comparing said test statistic to a threshold value to provide a target present or a target absent response when said signals are corrupted by Gaussian or non-Gaussian disturbance.

2. A method as recited in claim 1 wherein said step of estimating at least one linear filter parameter from said secondary data is achieved by use of the multichannel least squares (MLS) algorithm.

3. A method as recited in claim 1 wherein said step of estimating at least one linear filter parameter from said secondary data is achieved by use of the Nuttall-Strand (NS) algorithm.

4. Apparatus for processing signals from which to identify presence or absence of at least one potential target, which comprises:

means for receiving multi-channel signals containing said at least one potential target obscured by Gaussian or non-Gaussian disturbance;

means for partitioning said signals into secondary data having a low probability of containing said potential target and primary data to be assessed for the presence of said potential target;

means for estimating at least one linear filter parameter from said secondary data;

means for filtering at least one steering vector and said primary data with at least one whitening filter based on said at least one linear filter parameter to produce at least one steering vector residual and at least one primary data residual;

means for calculating a first quadratic term, said first quadratic term a function of said at least one steering vector residual, of said at least one linear filter parameter, and of said at least one primary data residual;

means for calculating a second quadratic term, said second quadratic term a function of said at least one steering vector residual and of said at least one linear filter parameter;

means for calculating a third quadratic term, said third quadratic term a function of said at least one primary data residual and of said at least one linear filter parameter;

means for calculating a test statistic as a function of said first, second and third quadratic terms; and means for comparing said test statistic to a threshold value to provide a target present or a target absent response when said signals are corrupted by Gaussian or non-Gaussian disturbance.

* * * * *

UNITED STATES PATENT AND TRADEMARK OFFICE
CERTIFICATE OF CORRECTION

PATENT NO. : 6,771,723 B1
DATED : February 4, 2003
INVENTOR(S) : Davis et al.

It is certified that error appears in the above-identified patent and that said Letters Patent is hereby corrected as shown below:

Title page,
Item [74], Inventors should read as follows:
-- James H. Michels
  Jaime R. Román
  Dennis W. Davis --

Signed and Sealed this

Twenty-eighth Day of September, 2004

JON W. DUDAS
*Director of the United States Patent and Trademark Office*